(12) United States Patent
Seeley

(10) Patent No.: US 11,137,271 B2
(45) Date of Patent: Oct. 5, 2021

(54) MULTI-SPECTRAL FEATURES SENSING TECHNIQUES AND SENSORS COMPRISING PLURAL GRATINGS WITH PLURAL CHIRP SLOPES

(71) Applicant: Ryan Seeley, North Logan, UT (US)

(72) Inventor: Ryan Seeley, North Logan, UT (US)

( * ) Notice: Subject to any disclaimer, the term of this patent is extended or adjusted under 35 U.S.C. 154(b) by 28 days.

(21) Appl. No.: 16/799,627

(22) Filed: Feb. 24, 2020

(65) Prior Publication Data

US 2020/0271485 A1 Aug. 27, 2020

Related U.S. Application Data

(60) Provisional application No. 62/808,937, filed on Feb. 22, 2019.

(51) Int. Cl.
*G01K 11/32* (2021.01)
*G01D 5/353* (2006.01)
*G01L 1/24* (2006.01)
*G01K 11/3206* (2021.01)

(52) U.S. Cl.
CPC ..... *G01D 5/35316* (2013.01); *G01K 11/3206* (2013.01); *G01L 1/246* (2013.01)

(58) Field of Classification Search
CPC ........... G01D 5/35316; G01D 5/35306; G01K 11/3206; G01L 1/246; G01L 1/242

USPC .................................................. 250/227.24
See application file for complete search history.

(56) References Cited

U.S. PATENT DOCUMENTS

| | | | |
|---|---|---|---|
| 6,024,488 A | 2/2000 | Wu et al. | |
| 10,480,936 B2 * | 11/2019 | 'T Hooft ............ | G01B 11/2441 |
| 2001/0030281 A1 | 10/2001 | Schulz et al. | |
| 2005/0111793 A1 | 5/2005 | Grattan et al. | |
| 2007/0156019 A1 | 7/2007 | Larkin et al. | |
| 2009/0123111 A1 | 5/2009 | Udd | |
| 2010/0259752 A1 | 10/2010 | Shah et al. | |
| 2012/0103066 A1 | 5/2012 | Xia et al. | |

FOREIGN PATENT DOCUMENTS

WO 2018/089831 A1 5/2018

* cited by examiner

*Primary Examiner* — Que Tan Le
(74) *Attorney, Agent, or Firm* — TraskBritt

(57) ABSTRACT

Various embodiments of sensors are described that exhibit several spectral features that together offer coverage of a wavelength range corresponding to the desired strain dynamic range (or temperature range) of a system. The spectral features arise from a Fabry-Perot interferometer formed by two overlapping chirped FBGs, the free-spectral range (FSR) of which varies with wavelength. The spectral features may be differentiated due to a combination of spacing and slope of the overlapped, chirped gratings.

10 Claims, 4 Drawing Sheets

Basic OFDR System

MULTI-SPECTRAL FEATURES SENSING TECHNIQUES AND SENSORS COMPRISING PLURAL GRATINGS WITH PLURAL CHIRP SLOPES

CROSS-REFERENCE TO RELATED APPLICATION

This application claims the benefit under 35 U.S.C. § 119(e) of U.S. Provisional Patent Application Ser. No. 62/808,937, filed Feb. 22, 2019, the disclosure of which is hereby incorporated herein in its entirety by this reference.

TECHNICAL FIELD

Embodiments of this disclosure relate, generally to optical sensors. In particular, various embodiments of this disclosure relate to an optical frequency domain reflectometry (OFDR) system and methods to perform distributed or quasi-distributed sensing of strain, temperature, and/or other effects that may be transduced to strain and or temperature along a sensing fiber.

BACKGROUND

Fiber-optic sensors are used for their low cost, excellent spatial coverage, small size, light weight, minimal associated intrusion, high accuracy, and reliability. Optical sensors embedded in an optical fiber sense strain (e.g., compression and tension), temperature, and/or other effects acting on an object or device under test (DUT). Strain acting on, or temperature of, the object effect physical changes in the sensing fiber that may be identified and measured by the optical sensor.

Fiber Bragg grating (FBG) optical fiber sensors exhibit a wavelength-selective reflection or transmission spectrum. The sensor is created by inducing a periodic refractive index profile within the core of an optical fiber, and exhibits a spectrum center (Bragg) wavelength $\lambda_B$ proportional to the period of refractive index variation $\Lambda$ per the relation $\lambda_B = 2n_e\Lambda$, where $n_e$ is the effective index of refraction within the grating. As tension or compression is longitudinally imparted on the fiber sensor, the spatial period of the refractive index profile is lengthened or shortened leading to an increase or decrease, respectively, of the center wavelength of the reflected spectrum. In addition, as the FBG is heated or cooled, the effective index of refraction is altered resulting in a proportionally-shifted center wavelength. Thus, by detecting the center wavelength shift of the reflection spectrum in an operational state relative to a nominal (i.e. calibration) state, a user may infer the strain or temperature difference between states. Though an FBG sensor is dually-sensitive to both strain and temperature, techniques exist for discrimination between strain and temperature.

Optical sensors are used to measure and characterize an object of interest (e.g., an object or device under test, without limitation) under mechanical stress as well as actively monitor it during operation. For example, optical sensors are used to test and characterize medical equipment, machinery, airframes, spaceframes, etc., as well as monitor them during operation.

OFDR-based sensor systems are typically utilized for applications in which high spatial resolution (e.g. several mm or less) is of key interest. Indeed, if a wide wavelength sweep range is employed, it is possible to differentiate response within an optical fiber on the scale of 10s of microns over 10s of meters of fiber.

FIG. 1 shows a typical OFDR system known to the inventor of this disclosure. A continuous-wave laser is employed and the laser output is tuned linearly in optical frequency over a given wavelength range. Light exiting the laser is split into reference and measurement paths, respectively, of a fiber-optic interferometer. Reference-path light exits the upper fiber of coupler 1 in the diagram and passes through a delay path to coupler 3. Measurement-path light exits the lower fiber of coupler 1 and passes through coupler 2 to the sensing fiber. In a typical OFDR sensing setup, the sensing fiber consists of a series of weak FBGs forming a quasi-distributed fiber sensor. These FBGs are typically ~10 mm in length with or without a gap between each sensor. Light reflects from a continuum of locations along the fiber corresponding to regions in which FBGs have been written. The back-reflected light enters coupler 2, exits the right-hand fiber from coupler 2 in the diagram, and combines/interferes with reference light at coupler 3. This is a simplified diagram and description; other optical components may be included to improve performance and lend polarization diversity to the system.

Consider reflection from a single location within the sensing fiber (in the interferometer measurement path) located at an optical time-of-flight delay $\tau_M$. This back-reflected light will interfere with reference light that underwent an optical delay $\tau_R$. If the optical field exiting the laser is denoted $\rho(t)e^{i\phi(t)}$, where $\rho(t)$ and $\phi(t)$ are the time-varying amplitude and phase of the laser output, respectively, the interference signal $I_D$ measured at the detector may be given by $$I_D = \text{slowly-varying terms} + 2\rho(t)^2 \alpha_M \alpha_R \cos(\phi(t-\tau_M) - \phi(t-\tau_R))$$

where $\alpha_M$ and $\alpha_R$ are the cumulative losses through the measurement and reference paths, respectively. If a laser is swept linear in optical frequency, one may describe the optical frequency $v$ exiting the laser as $$v(t) = v_o + kt$$

where k is the sweep speed in Hz/s, and t is time. The laser phase is the integral of the optical frequency, $$\phi(t) = \phi_o + v_o t + \frac{kt^2}{2}$$

and it may be depicted that, within a phase constant, $$\phi(t-\tau_M) - \phi(t-\tau_R) = -kt(\tau_M - \tau_R)$$

High-pass filtering (AC-coupling) the detector intensity signal $I_D$ and substituting the above relation, one arrives at the relation $$\tilde{I}_D \propto \alpha_M \cos(\omega t); = k\Delta\tau_{MR}$$

where $\tilde{I}_D$ is the time-varying component of the detector intensity, and $\Delta\tau_{MR} = \tau_M - \tau_R$ (and where again, a phase constant has been dismissed). Thus, the cumulative loss $\alpha_M$ in the measurement path is frequency-encoded as a function of delay down the sensing fiber.

The inventor of this disclosure appreciates that the above treatment assumes there is only one back-reflection event located at optical delay $\tau_M$ down the sensing fiber, and further appreciates that there is a superposition of back-reflected optical fields at a continuum of delays down the sensing fiber. It can be depicted that the entire distributed complex reflectance of the sensing fiber is encoded by modulation frequencies proportional to a continuum of time-of-flight measurement-path delays.

$\tilde{I}_D$ can be Fourier-transformed to reveal a signal proportional to the complex reflectance as a function of delay (i.e. distance) down the fiber. If a series of FBGs is written into the sensing fiber, they can all be written at the same nominal center wavelength. Each grating will appear as a rectangular function in this transform-domain representation (or as the apodization function if an apodized grating is used). In an implementation simplified for ease of illustration, individual gratings may then be windowed in the transform domain and inverse-transformed back to the spectral domain to separate the response of each grating from that of other gratings within the fiber. The resulting signal for each grating is reflectance versus optical frequency, from which the center wavelength and therefore strain or temperature may be inferred.

Returning to FBG theory, one can calculate a wavelength range $\Delta\lambda_B$ required to accommodate a given required strain dynamic range $\Delta\varepsilon$ as $$\Delta\lambda_B = K_\varepsilon \lambda_B \Delta\varepsilon$$

where $K_\varepsilon$ is the coefficient of strain. For standard optical fiber and a nominal Bragg wavelength $\lambda_B$=1550 nm, the required wavelength range is approximately 24 nm for a ±10,000με dynamic range. Thus, the laser employed in a typical ±10,000με sensing system must be capable of linearly sweeping over a 24-nm wavelength range. What is more, for a given system sample rate $f_s$, the total range $\Delta\lambda_B$ must be swept in a time period $T_s=1/f_s$. This puts a constraint on the required sweep speed of the laser such that $$k = \Delta v_B \cdot f_s$$

where $\Delta v_B$ is the optical frequency equivalent of $\Delta\lambda_B$, giving $$\omega = \Delta v_B f_s \Delta\tau_{MR}$$

Thus, the modulation frequency associated with a given measurement delay $\tau_M$ is proportional to the required wavelength range $\Delta v_B$ and in turn proportional to $\Delta\varepsilon$. Thus, as the strain dynamic range is increased—all other parameters being equal—the modulation frequency also increases and thus the sample rate of the front-end acquisition hardware must also increase.

Thus, the inventor of this disclosure appreciates that existing OFDR systems suffer from specific limitations related to interdependencies between strain (or temperature) dynamic range of the system, system sample rate, and sensing length. These interdependencies result in a sensing technology that exhibits fundamental limits with respect to key system characteristics of interest (i.e. sensing length, system update rate, and or dynamic range).

For example, assume that the strain dynamic range of the system is fixed and an increased sensing length is desired. In conventional OFDR systems, the strain dynamic range is proportional to the required wavelength range that will be demodulated. For a given signal bandwidth, the length of sensing fiber that may be interrogated is inversely proportional to the sweep speed of the light source. Thus, if an increased sensing length is required, the sweep speed must be decreased. For a fixed wavelength range (fixed strain dynamic range), the system sample rate will decrease because more time will be required per sweep in order for the swept-wavelength light source to sweep the given wavelength range at a lower speed. Similarly, if the system sample rate is increased, the sweep speed will increase and so the sensing length will decrease.

In a second example, assume that the system sample rate is fixed and an increased sensing length is desired. Since the time period over which the wavelength sweep must be performed is fixed (due to the fixed system sample rate, the inverse of which defines the sweep time period), and since an increased sensing length requires a slower sweep speed, the wavelength range and therefore strain dynamic range will decrease. Alternatively, if it is desired to increase the strain dynamic range, the sensing length will decrease.

In a third example, assume that the sensing length is fixed and an increase in system sample rate is desired. An increase in system sample rate means there is less time to perform the wavelength sweep. The fixed sensing length, however, requires that the sweep speed also be fixed. Thus, the wavelength range and therefore the strain (or temperature) dynamic range will decrease. Similarly, if the strain dynamic range is increased, the system sample rate will decrease.

The inventor of this disclosure appreciates that one option for narrowing the wavelength sweep range is to use overlapped single-frequency fiber Bragg gratings (FBGs) with specific combinations of wavelength spacing between spectral peaks and/or specific patterns of reflection amplitude being exhibited by the individual overlapped gratings. The individual single-frequency FBGs yielding the multi-wavelength spectral response are completely overlapped; the specific patterns of wavelength spacing and/or reflection amplitude may be used to unambiguously identify which spectral lobes lie outside the narrow wavelength sweep (i.e. which are not included in the narrow wavelength sweep).

However, the inventor of this disclosure appreciate that such a method exhibits a reduced wavelength range that must necessarily include three or more reflection peaks in order to unambiguously identify which overlapping FBG belongs to a given reflection peak. This is especially the case where there are many overlapping FBGs in one sensor. Some overlapped FBG systems have introduced specific modifications to reflectance amplitude of the individual overlapped FBGs to characterize the reflection peaks. In addition to adding complexity to the grating fabrication process, this also results in a greater wavelength spacing (and greater resultant narrow wavelength range) than would otherwise be required since the wavelength spacing must ensure that low-reflectance wavelength peaks may correctly be resolved in the presence of high-reflectance peaks. Other overlapped FBG systems rely on specific patterns of wavelength spacing between neighboring spectral response of overlapped FBGs. This necessarily increases the minimum wavelength spacing between spectrally-neighboring grating center wavelengths and thus increases the minimum narrow wavelength range required to unambiguously identify which spectral-domain peaks are not included within the narrow wavelength range.

The inventor of this disclosure appreciates that conventional OFDR systems and overlapped FBGs, may also use a spectrogram calculation that leads to reduced delay-domain resolution along the sensing fiber. Significant local strain gradients over a spatial scale on the order of the delay-domain resolution will result in broadening of spectral-domain reflection peaks. Since, in theory, it is not possible to otherwise isolate the individual spectral-domain response resulting from each of the overlapped gratings, the wavelength spacing between center wavelengths of the overlapped FBGs needs to be increased in order to differentiate the broadened peaks. This in turn results in a wider reduced wavelength range than would otherwise be required.

Finally, such systems may require many overlapped FBGs, i.e. many exposures of the fiber to phase masks of varying period, or singe exposure to an expensive and difficult to fabricate multi-period phase mask.

Limitations and disadvantages in addition to and/or different than those discussed above may also exist.

Accordingly, the inventor of this disclosure appreciates a need for an OFDR-based optical sensor and interrogator, and systems that use the same, that does not have the same limitations and disadvantages of the prior art.

BRIEF SUMMARY

Various embodiments of the disclosure comprise OFDR systems and techniques for optical sensors and interrogators that allow for inference of strain or temperature over a given dynamic range using narrow wavelength sweeps.

Embodiments of sensors of the present disclosure exhibit several spectral features that together offer coverage of a wavelength range corresponding to the desired strain dynamic range (or temperature range) of the system. The spectral features arise from a Fabry-Perot interferometer formed by two overlapping chirped FBGs, the free-spectral range (FSR) of which varies with wavelength. The spectral features may be differentiated due to the combination of spacing and slope of the overlapped, chirped gratings, which guarantees that the range of possible FSR (for a given strain dynamic range) differs from the range of possible FSR of neighboring spectral features.

In various embodiments, sensors are described that comprise overlapped chirped FBGs that may form a multi-grating unit, each chirped FBG of a unit having a unique chirp slope and a specific spacing between other FBG(s) of the unit, yielding a Fabry-Perot response the FSR of which varies over the wide wavelength range corresponding to the desired strain (and or temperature) dynamic range, and thus yielding spectral features spaced across the wide wavelength range. In various embodiments of the systems and methods described herein, one may infer the complete strain and/or temperature profile over a dynamic range not normally obtainable with the small wavelength range.

Those of ordinary skill in the art will understand that the embodiments described herein are scalable and other embodiments may be applied to narrower ranges than those specifically described. Depending on the application, the some embodiments may be applied at wavelength ranges orders of magnitude narrower than what is described.

DETAILED DESCRIPTION

Figure 1:
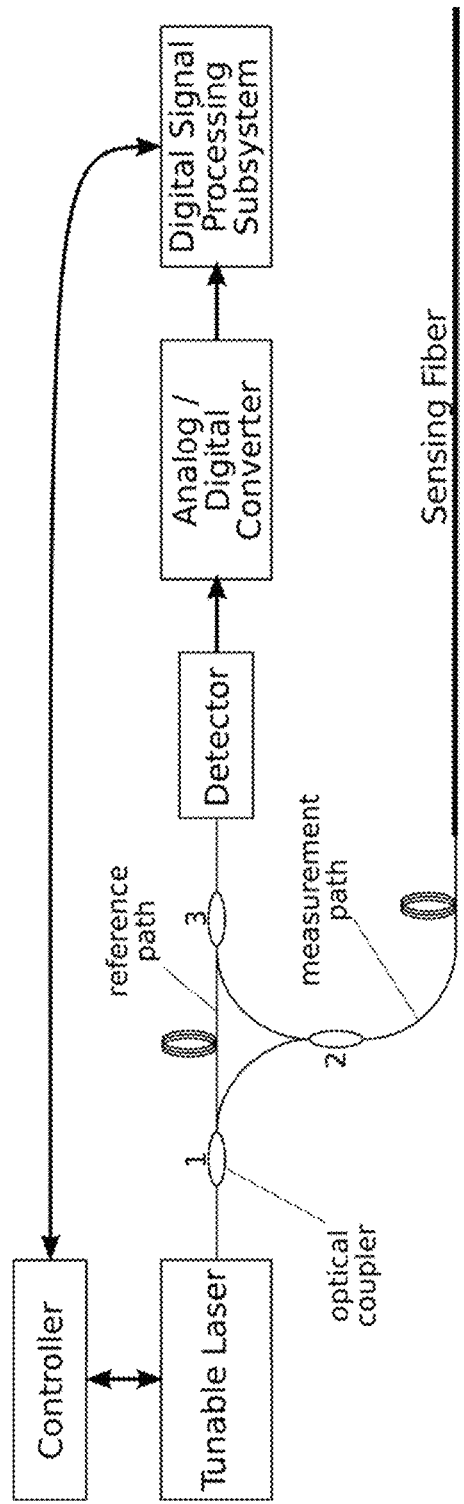
FIG. 1 is a block diagram of a conventional OFDR system.

The various embodiments described here comprise an OFDR system and technique that allows for inference of strain or temperature over a large dynamic range using a narrow wavelength range. Embodiments of the sensor fiber may be composed of one or more multi-spectral-feature sensors, each sensor exhibiting several spectral features that together offer coverage over a wavelength range corresponding to the desired system strain and/or temperature dynamic range. As used herein, a "spectral feature" is a feature of functional form (e.g. a lobe, a peak, a trough, or other functional form) discernible in the spectral domain. Embodiments of the disclosure may comprise a number of multi-spectral-feature sensors including sensors comprised of multiple chirped-frequency (or substantially chirped-frequency) FBGs.

Various embodiments of fiber-optic sensors described herein reduce the required OFDR interrogation wavelength range by approximately an order of magnitude relative to conventional OFDR systems. In one embodiment, a fiber-optic sensor is formed by two closely-spaced, chirped fiber-Bragg gratings (CFBGs) having different chirp slopes. The pair of CFBGs forms a Fabry-Perot (FP) cavity with linearly-varying (sloped) FP cavity length versus wavelength; the sensor is therefore denoted as a CFBG-SFP sensor herein. (Note that the pair of CFBGs may be nonlinearly chirped such that the Fabry-Perot cavity length need not vary linearly versus wavelength). The sensor is described in more detail, below.

One of ordinary skill in the art will understand that the order-of-magnitude reduction in wavelength range afforded by the proposed sensor leads to many advantages, including: (1) an order of magnitude decrease in OFDR bandwidth for a given sensing length, (2) an order of magnitude increase in sensing length for a given OFDR bandwidth, and/or (3) a combination of improvement in both OFDR bandwidth and sensing length. In addition, the subject technology allows for a reduction of roughly an order of magnitude in operational laser sweep range.

Conventional commercial off-the-shelf (COTS) OFDR systems exhibit a sensor spacing of ~1 cm, sensing length of 10-50 m per channel and system sample rates of 100-250 Hz. Given similar acquisition hardware, embodiments of the proposed sensor described herein may, for example, be used to extend the sensing length to hundreds of meters per channel or to extend the sample rate to tens of kHz. Unlike current FBG-based COTS systems, there would be no reduction in strain/temperature dynamic range as the system sample rate is increased—full dynamic range is inherently supported at full sample rate. By way of example, for a ±10,000µε OFDR system typically requiring a 24 nm system scan range, the CFBG-SFP sensor is estimated to require only an approximate 2 nm scan range to unambiguously demodulate the sensor over the full strain range with comparable accuracy and repeatability to the current state of the art.

One embodiment described herein is a specialized fiber-optic sensor and associated demodulation algorithm that may be used for OFDR-based distributed sensing. Where a standard FBG sensor exhibits a single-lobe reflection spectrum as depicted in the left side of FIG. 2, the sensor described herein may exhibit a response periodic in wavelength, with linear change in the period as depicted in the right graph of FIG. 2. The proprietary sensor exhibits several response lobes that are spaced over the desired wavelength range $\Delta\lambda_B$ (in this case ±12 nm from nominal). The example CFBG-SFP response depicted in the figure begins on the low-wavelength side with a 1.25 nm FSR (≈650 µm spacing) and ends on the high-wavelength side with a 1.75 nm FSR (≈450 µm spacing). Because the response derives from Fabry-Perot interference, the width of the lobes is increased relative to a standard FBG. Vertical dotted lines represent a narrow wavelength range used to interrogate the sensor (whereas the full 24 nm—the full width of the graphs—is required to interrogate distributed single-frequency FBGs). Wavelength is depicted relative to nominal (i.e. zero-strain) wavelength.

Figure 2:
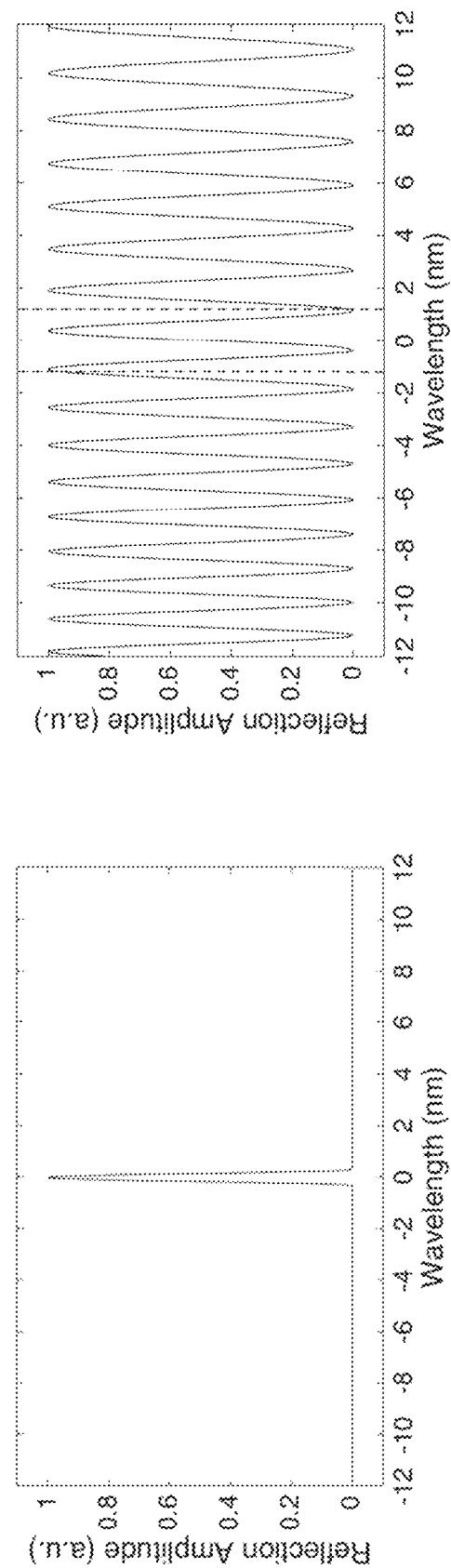
FIG. 2 is a graph depicting a comparison of an example spectral response of a conventional FBG sensor (left) known to the inventor of this disclosure and an example spectral response of an embodiment of CFBG-SFP sensor (right) corresponding to an embodiment depicted in FIG. 4.
Figure 3:
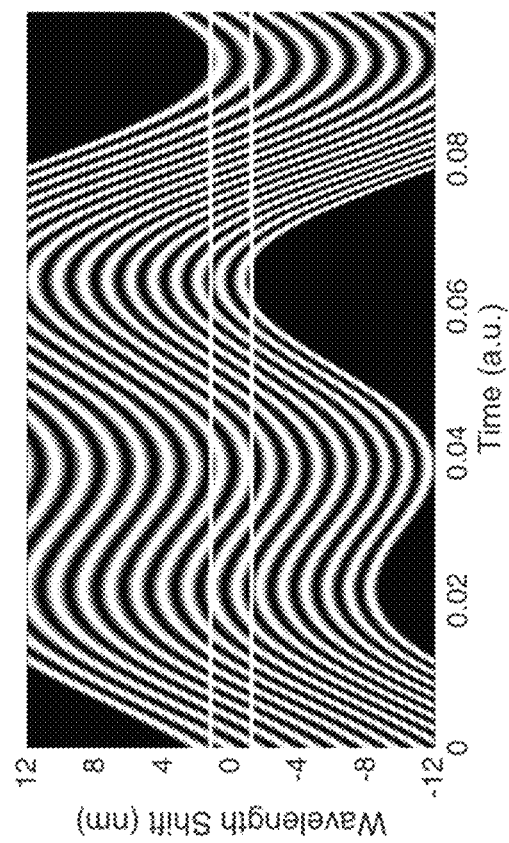
FIG. 3 is a graph depicting a comparison of reflection intensity with time-varying strain perturbation of: an example FBG spectrum (left) known to the inventor of this disclosure; and an example CFBG-SFP spectrum (right) in accordance with disclosed embodiments.
Figure 3:
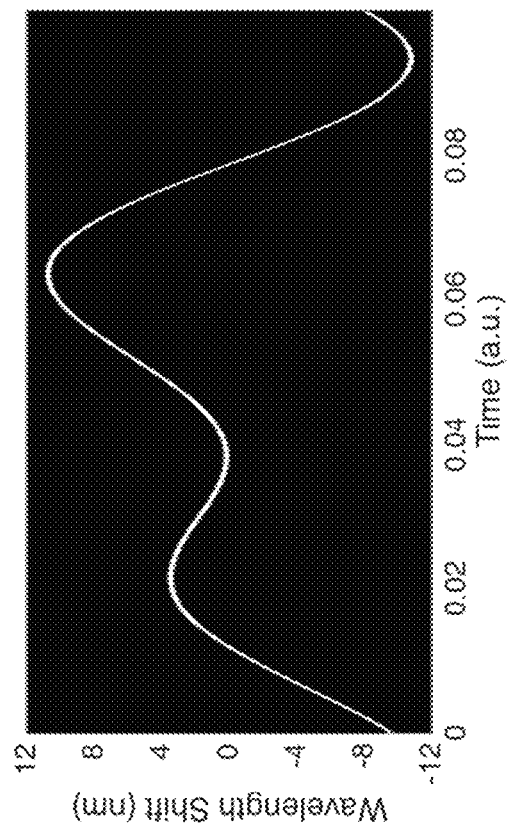

Consider that the sensors depicted in the responses of FIG. 2 are perturbed by an axial strain as a function of time. The resulting perturbation of the standard and CFBG-SFP sensors is depicted in the left and right graphs, respectively, of FIG. 3 as a time-varying change in center wavelength of the lobes. Note that the responses from FIG. 2 are now depicted as grayscale intensity graphs as a function of time on the x-axis and wavelength shift on the y-axis. The right graph also shows two horizontal lines representing the same narrow wavelength range. One of ordinary skill in the art will readily see that there is now sufficient information within the narrow wavelength range to extract the full perturbation profile if there is always at least one peak within the narrow range and the peak may be absolutely identified (i.e. which of the several peaks depicted in FIG. 2, right, is/are present within the narrow wavelength range depicted by the horizontal lines of FIG. 3, right).

Figure 4:
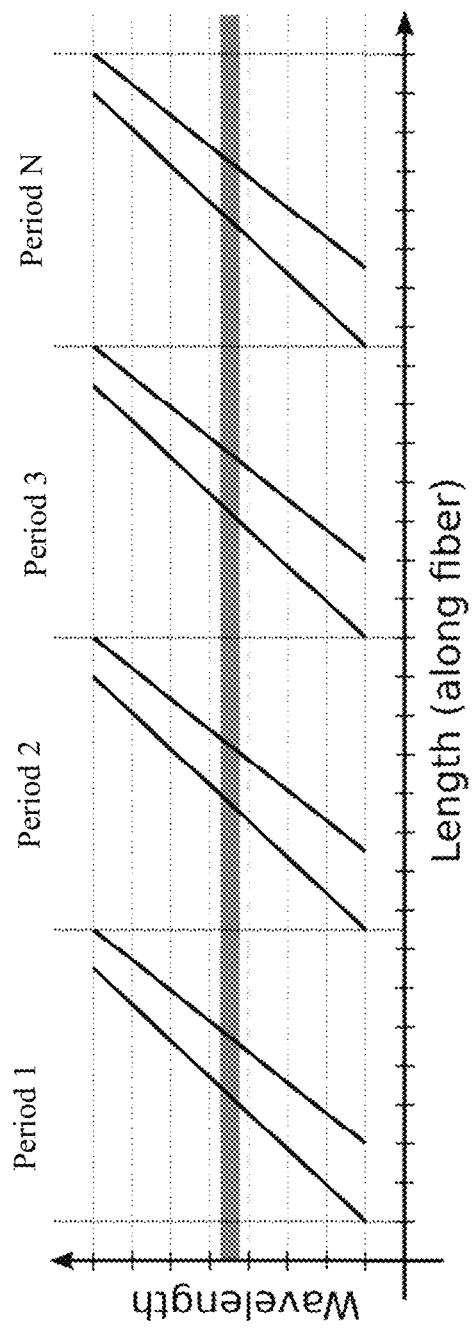
FIG. 4 is a diagram depicting an embodiment of a sensing unit including four CFBG-SFP sensors arranged along a portion of an optical fiber.

The spectrum depicted in FIG. 2, right graph, may be obtained via a sensor constructed in accordance with the embodiment depicted in FIG. 4 and as discussed herein. In one embodiment, a sensor of this disclosure may be formed by superimposing two (or more) chirped fiber Bragg gratings (CFBGs), each having different chirp slope, with a precisely-controlled nominal spacing between the two (or more) gratings. The sensor may be formed on or in a support structure (e.g., an optical fiber or portion thereof, without limitation). Two or more sensors may form a sensing unit.

The CFBGs form a Fabry-Perot cavity with a cavity length (and free spectral range, i.e. FSR) that varies linearly along the length of the CFBG-SFP sensor. The diagonal lines in depicted in FIG. 4 represent the chirp slope of each CFBG sensor. Vertical dotted lines depicted in FIG. 4 delineate individual sensors. A reduced wavelength range used to interrogate the sensors is depicted by the horizontal gray bar. The horizontal distance between the chirp slope lines at a given wavelength defines the Fabry-Perot cavity length (and FSR) at that wavelength. Notably, the spacing between reflected wavelength (between diagonal lines) decreases with increasing wavelength. Thus, FSR of the periodic reflection spectrum increases with increasing wavelength.

In an embodiment depicted in FIG. 4 (notably, spacing between CFBGs and slope difference depicted by FIG. 4 are exaggerated for illustrative purposes), the FSR of each period (e.g., period 1, period 2, period 3, . . . period N depicted in FIG. 4) of the periodic spectral response differs from the FSR of its neighbors by a sufficient amount such that when strains at the extents of the design strain range are imposed on the fiber, the FSR is contained within a range distinguishable from its neighbor. Table 1 shows this more clearly for the first four peaks of the figure. This table shows minimum, nominal, and maximum FSR exhibited by the sensor corresponding to −10,000, 0, and +10,000με imparted on the fiber sensor. As depicted in the table, the range of each FSR is unique and does not overlap the range of the FSR associated with neighboring peaks.

Note that the center spacing between CFBG-SFP sensors may be less than, equal to, or greater than the length of each CFBG-SFP sensor.

TABLE 1

FSR (Free Spectral Range) i.e. wavelength spacing between peaks X&Y for the first few peaks of FIG. 2, right.

| FSR Spanning Peaks X&Y | Min. FSR (−10,000 με) | Nom. FSR (0 με) | Max. FSR (+10,000 με) |
|---|---|---|---|
| 0&1 | 1.242 | 1.254 | 1.267 |
| 1&2 | 1.271 | 1.284 | 1.296 |
| 2&3 | 1.300 | 1.313 | 1.326 |
| etc. | | | |

By tailoring the chirp slopes and spacing of the CFBGs forming the CFBG-SFP sensor, a sensor FSR may be selected for each period of the response the range of which is unique from that of all other FSR ranges for the chosen supported strain range Δε. Because each FSR in the spectral response of the sensor is unique for the design strain range, the FSR may be used (inferred via a precise measure of relative wavelength between peaks) to absolutely identify which peaks appear in the narrow wavelength range interrogated by the instrument. By characterizing the nominal wavelengths of all the peaks of the sensor spectral response in a calibration step before operation, the current wavelength of the given peaks within the swept wavelength range may be deduced and the strain may be inferred from the difference between current and nominal wavelengths.

The ability to infer an absolute wavelength shift between current and nominal conditions given a narrow wavelength range offers a system with tremendous advantages. The key advantage to the present innovation is that the wavelength range $\Delta\lambda_B$ required to accommodate a given strain dynamic range $\Delta\varepsilon$ is significantly decreased. For example, with an optimized sensor design, a ~10× reduction in required wavelength range may be attained. If the required interrogation wavelength range is reduced by a factor R, the resulting scan speed required to cover the wavelength range at system sample rate $f_s$ becomes $$k = \frac{\Delta v_B \cdot f_s}{R}$$

and thus, the required OFDR demodulation bandwidth for a given sensing length (i.e. maximum measurement path time-of-flight delay $T_M$) is also reduced by a factor R. Alternatively, for a given demodulation bandwidth either the sensing length or the system sample rate may be increased by a factor R. In the above example, a wavelength range twice the maximum FSR (in this example, 3.5 nm) is all that is required to infer strain across the entire strain range. For a standard OFDR system, a wavelength range of 24 nm is required to achieve the same strain range. In addition, if some level of time- and strain-invariance may be assumed relative to the system sample rate, the wavelength range may be as small as the maximum FSR across the response (1.75 nm in this example), offering a ~10× reduction in wavelength range required to demodulate the sensor.

The sensor embodiments described herein may be manufactured in volume via a single exposure per grating to a phase mask in a side-write configuration on a draw tower, leaving the bulk of the complexity of sensor fabrication to an initial (one-time) fabrication of the phase mask. Alternatively, the sensor may be manufactured by splitting a single output beam from a laser appropriate for writing FBGs using an optical beam splitter, then using mirrors and separate chirped FBG phase masks to expose the fiber simultaneously to the two CFBG patterns with different chirp slope and precisely-controlled spacing.

One of ordinary skill in the art will recognize that the embodiments described herein have many benefits and advantages. For example, expanded measurement and analysis methodologies, improved test data acquisition and management, fast response, low volume, minimal intrusion, long life cycle, lower maintenance, high accuracy, and high reliability. Examples of applications include: flight research and acquisition of real-time flight data; monitoring and characterizing propulsion system performance; monitoring and characterizing electric motors and turbines; and improved instrumentation for improved measurement and analysis, generally. One of ordinary skill in the art will recognize other advantages and benefits, and other applications.

Some embodiments relate, generally, to a method. The method may include, sweeping an optical source across a subset of a wide-band spectral response range of a sensing unit; inspecting one or more of a period of a spectral response of the sensing unit and a phase of the spectral response of the sensing unit; and inferring an absolute wavelength shift of the sensing unit or a relative wavelength shift of the sensing unit responsive to the inspected spectral response.

Some embodiments relate, generally, to an optical frequency-domain reflectometry (OFDR) system. The OFDR system may include at least one sensor, an optical source, and a signal processor. The least one sensor may be configured in accordance with embodiments of sensors disclosed herein. The optical source may be configured in accordance with embodiments of optical sources disclosed herein. In one embodiment, the optical source may be a swept optical source. It may be configured to sweep (e.g., with optical energy) a subset of a wide-band spectral response range of the at least one sensor. The signal process may be configured to inspect one or more of a period of a spectral response of the sensor and a phase of the spectral response of the sensor. The signal processor may be configured to infer an absolute wavelength shift of the sensor or a relative wavelength shift of the sensor in response to the inspected spectral response.

In one embodiment, an OFDR system in accordance with disclosed embodiments may include a controller. The controller may be configured to control, at least in part, an optical source t accordance with disclosed embodiments. The controller may be configured to control, at least in part, a signal processor in accordance with disclosed embodiments.

In a contemplated use, an OFDR system in accordance with disclosed embodiments may be deployed with an object of interest (e.g., object or device under test (DUT), without limitation) and characterize physical changes at an object of interest that correspond to physical changes (e.g., temperature change, strain change, without limitation) at a sensor.

Some embodiments relate, generally, to an interrogator. The interrogator may include an optical light source, a detector, an analog to digital converter, and a signal processor. The optical light source and signal processor may be configured in accordance with disclosed embodiments. In a contemplated use, an interrogator in accordance with disclosed embodiments may be used to interrogate a sensing unit, such as a sensing unit in accordance with disclosed embodiments, without limitation.

It is to be understood that the features of the various embodiments described herein were not mutually exclusive and can exist in various combinations and permutations, even if such combinations or permutations were not made express herein, without departing from the scope of the disclosure. In fact, variations, modifications, and other implementations of what was described herein will occur to those of ordinary skill in the art without departing from the scope of the disclosure. As such, the invention is not to be defined only by the preceding illustrative description, but only by the claims which follow, and legal equivalents thereof.

Although each operation illustrated by or in connection with the figures and text recites acts performed in a particular order, embodiments of the present disclosure do not necessarily need to operate in that recited order. One of ordinary skill in the art would recognize many variations, including performing acts in parallel, or in a different order.

I claim:

1. A sensing unit, comprising:
   a first sensor comprising:
      a first grating having a first chirp slope; and
      a second grating having a second chirp slope,
         wherein the first grating and the second grating are separated by a first spatial offset; and
   a second sensor comprising:
      a third grating having a first chirp slope; and
      a fourth grating having a second chirp slope,
         wherein the third grating and the fourth grating are separated by a fixed spatial offset.

2. The sensing unit of claim 1, wherein the first grating and the second grating overlap along a length of a support structure.

3. The sensing unit of claim 2, wherein the support structure is at least a portion of a fiber optic cable.

4. The sensing unit of claim 1, wherein the first sensor and the second sensor overlap along a length of a support structure.

5. The sensing unit of claim 1, wherein the first grating and the second grating do not overlap along a length of a support structure.

6. The sensing unit of claim 1, wherein the first sensor and the second sensor do not overlap along a length of a support structure.

7. An Optical Frequency-Domain Reflectometry (OFDR) system comprising:
   at least one sensing unit;
   an optical source configured to sweep across a subset of a wide-band spectral response range of the at least one sensing unit; and
   a signal processor configured to inspect a spectral response of the at least one sensing unit and infer one or more of an absolute wavelength shift associated with the at least one sensing unit and a relative wavelength shift associated with the at least one sensing unit.

8. The OFDR system of claim 7, wherein the at least one sensing unit comprises:
   a first sensor comprising:
      a first grating having a first chirp slope; and
      a second grating having a second chirp slope,
         wherein the first grating and the second grating are separated by a first spatial offset; and
   a second sensor comprising:
      a third grating having a first chirp slope; and
      a fourth grating having a second chirp slope,
         wherein the third grating and the fourth grating are separated by a fixed spatial offset.

9. A method comprising:
sweeping an optical source across a subset of a wide-band spectral response range of a sensing unit;
inspecting one or more of a period of a spectral response of the sensing unit and a phase of the spectral response of the sensing unit; and
inferring an absolute wavelength shift of the sensing unit or a relative wavelength shift of the sensing unit.

10. The method of claim 9, further comprising:
inferring one or more of temperature and strain about an object of interest responsive to one or more of an inferred wavelength shift of the sensing unit and an inferred relative wavelength shift of the sensing unit.

\* \* \* \* \*